United States Patent
Kohiyama

(10) Patent No.: US 6,393,542 B1
(45) Date of Patent: May 21, 2002

(54) ELECTRONIC CIRCUIT SYSTEM AND INTERFACE CIRCUIT THAT COMPARES READ AND WRITE CLOCK OPERATIONS

(75) Inventor: Kiyoshi Kohiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/303,606

(22) Filed: May 3, 1999

(30) Foreign Application Priority Data

May 21, 1998 (JP) .......................................... 10-139800

(51) Int. Cl.⁷ .......................... G06F 13/00; G06F 12/00
(52) U.S. Cl. ...................... 711/167; 711/104; 713/500; 713/503; 713/600; 365/194; 365/233; 365/189.01
(58) Field of Search ................................. 711/167, 170, 711/104, 105; 713/500, 501, 502, 503, 600; 365/230.01, 233, 189.01, 189.05, 189.12, 194

(56) References Cited

U.S. PATENT DOCUMENTS

| | | | |
|---|---|---|---|
| 4,965,799 A | * | 10/1990 | Green et al. ................ 714/719 |
| 5,301,278 A | * | 4/1994 | Bowater et al. ................ 711/5 |
| 5,307,320 A | * | 4/1994 | Farrer et al. ........... 365/230.01 |
| 5,335,337 A | * | 8/1994 | Gagliardo et al. .......... 713/401 |
| 5,530,944 A | * | 6/1996 | Stones ........................ 711/167 |
| 5,926,838 A | * | 7/1999 | Jeddeloh ..................... 711/167 |
| 6,115,318 A | * | 9/2000 | Keeth ......................... 365/233 |

\* cited by examiner

*Primary Examiner*—Hong Kim
(74) *Attorney, Agent, or Firm*—Arent Fox Kintner Plotkin & Kahn, PLLC

(57) ABSTRACT

An electronic circuit system includes a CPU, a semiconductor memory device that operates on the basis of an external clock, and an interface circuit that permits read and write operations for data with respect to the semiconductor memory device under a control operation of the CPU. The interface circuit includes a read data storage unit that stores read data from the semiconductor memory device, a write data storage unit that stores write data to be written in the semiconductor memory device, and an operation speed setting unit that sets a reading speed and a writing speed to predetermined speeds under the control operation of the CPU. The CPU compares the read data in the read data storage unit and the write data in the write data storage unit.

17 Claims, 6 Drawing Sheets

ELECTRONIC CIRCUIT SYSTEM AND INTERFACE CIRCUIT THAT COMPARES READ AND WRITE CLOCK OPERATIONS

BACKGROUND OF THE INVENTION

1. Field of the Invention

The present invention relates to an electronic circuit system having a CPU, a semiconductor memory device operated on the basis of a clock supplied from an external unit and an interface circuit permitting read and write operations for data with respect to the semiconductor memory device based on control by the CPU.

In the recent years, mass storing and high speed have been progressing for the semiconductor memory device, and specifically, in a DRAM (Dynamic Random Access Memory), such a tendency is notable.

Since the mass storing and high speed for the semiconductor memory device, there is a progressing tendency for the data transmission between the semiconductor memory device and an interface circuit or a CPU to the high speed.

2. Description of the Related Art

A description will now be given of a conventional electronic circuit system having a semiconductor memory device operating on the basis of a clock from an external unit and an interface circuit permitting read and write operations for data with respect to the semiconductor memory device based on control by the CPU.

A conventional electronic circuit system in which , a DRAM (Dynamic Random Access Memory) is, for example, used as the semiconductor memory device is shown in FIG. 1.

Referring to FIG. 1, the electronic circuit system has a CPU 101, a DRAM 102, a system LSI 103 and a clock generating circuit 104. The CPU 101 controls the read and write operations for the data with respect to the DRAM 102 (the semiconductor memory device). The DRAM 102 operates on the basis of a clock from the clock generating circuit 104 in the read and write operations for the data. The system LSI 103 operates as an interface circuit which executes the read and write operations for the data with respect to the DRAM 102 based on the control from the CPU 101. The clock generating circuit 104 generates the clock used for the DRAM 102 and the system LSI 103.

The DRAM 102 and the system LSI 103 are connected by a clock signal line, control signal lines for read and write signals and other control signals, address lines and data lines. In this example shown in FIG. 1, a number n of address lines and a number m of data lines respectively correspond to a number of bits of the capacity of the DRAM 102.

The clock generated by the clock generating circuit 104 is supplied, as a system clock, to the DRAM 102 and the system LSI 103 and used as the basis for operations in the DRAM 102 and the system LSI 103. That is, the DRAM 102 and the system LSI 103 operate in synchronism with the system clock. The former DRAM did not operate in synchronism with a clock, but operated on the basis of control signals, such as read and write signals. However, in recent DRAMs, the control signals, such as the read and write signals become definite on the basis of the system clock and an operations is started in order to execute the read and write operations for the data at a high speed.

In the conventional electronic circuit apparatus as described above, to write data in the DRAM 102, the CPU 101 sets write data and write address in an output register 106 via a CPU interface 105 in the system LSI 103. The CPU 101 then inputs a write command on-signal to a signal generating circuit 108. In the system LSI 103, the output register 106 outputs the write data, together with the write address, on the basis of the system clock. The signal generating circuit 108 activates and outputs a write signal. In the DRAM 102, the write data is written at the specified address on the basis of the system clock when the write signal is activated.

On the other hand, to read out data from the DRAM 102, the CPU 101 sets a read address in the output register 106 via the CPU interface 105 in the system LSI 103. The CPU 101 then inputs a read command on-signal to the signal generating circuit 108. In the system LSI 103, the read address is output and the signal generating circuit 108 activates and outputs a read signal. In the DRAM 102, data is read out from the specified address on the basis of the system clock when the read signal is activated. In the system LSI 103, the read data is set in an input register 107 on the basis of the system clock. In this state, the CPU 101 reads out the data from the input register 107.

In the conventional electronic circuit system, there is not a little wiring delay in the data lines connecting the DRAM 102 (the semiconductor memory device) and the system LSI 103 (the interface circuit). The wiring delay is permitted to fall within a permissible range. A circuit board is designed so that the wiring delay is as small as possible. Due to the high speed operations in the semiconductor memory device (the DRAM), there is a tendency to narrow the permissible range. Thus, it is difficult to cope with the wiring delay by only the formation of the circuit board.

When the CPU reads out data from the semiconductor memory device, the interface circuit may not read the read data due to the wiring delay in the data lines. In the same manner as in the above case, in the write operation for data with respect to the semiconductor memory device, the data may not be written in the semiconductor memory device.

Further, if there is variation of the wiring delay among the data lines connecting the semiconductor memory device and the interface circuit, the wiring delay in a part of the data lines may not fall within the permissible range. As a result, the data may not be written in the semiconductor memory device.

SUMMARY OF THE PRESENT INVENTION

Accordingly, a general object of the present invention is to provide novel and useful electronic circuit system and interface circuit in which the disadvantages of the aforementioned prior art are eliminated.

A specific object of the present invention is to provide an electronic circuit system in which a CPU can accurately execute read and write operations for data with respect to a semiconductor memory device even if there are wiring delay and variation thereof in data lines.

The above objects of the present invention are achieved by an electronic circuit system comprising: a CPU; a semiconductor memory device that operates on the basis of a clock; and an interface circuit that permits read and write operations for data with respect to the semiconductor memory device under a control operation of the CPU, wherein the interface circuit comprises: a read data storage unit that stores read data from the semiconductor memory device; a write data storage unit that stores write data to be written in the semiconductor memory device; and an operation speed setting unit that sets a reading speed and a writing speed to predetermined speeds under the control operation of the CPU, wherein the CPU compares the read data in the read data storage unit and the write data in the write data storage unit.

The above predetermined speeds set by the operation speed setting unit may include a low speed corresponding to a low speed write mode and a low speed read mode and a high speed, higher than the low speed, corresponding to a high speed write mode and a high speed read mode. The read data in the read data storage unit and the write data in the write data storage unit corresponds with each other with certainty in a case where after a write operation in the low speed write mode is executed with respect to a predetermined address of the semiconductor memory device, a read operation in the low speed read mode is executed with respect to the same address of the semiconductor memory device. Operations are usually executed in the high speed write mode and the high speed read mode.

The above interface circuit may have a timing control unit that controls a delay time of the clock when the read data in the read data storage unit and the write data in the write data storage unit do not correspond with each other.

Further, the timing control unit may control the delay time of the clock for each of data lines, connecting the semiconductor memory device and the interface circuit, separately.

According to the present invention, since the reading speed and the writing speed can be set to the predetermined speeds, it can be determined, by comparing the read data and the write data obtained in the read operation and the write operation at the reading speed and the writing speed both of which are set to the predetermined speeds, whether errors have occurred in the write operation, the read operation or both the operations.

In addition, since the delay time of the clock used for the semiconductor memory device is controlled, a CPU can accurately execute read and write operations for data with respect to a semiconductor memory device even if there are wiring delay and variation thereof in data lines.

Another object of the present invention is to provide an interface circuit used in the electronic circuit system as described above.

The above objects of the present invention are achieved by an interface that permits read and write operations for data with respect to a semiconductor memory device under a control operation of a CPU, the interface circuit comprising: a read data storage unit that stores read data from the semiconductor memory device; a write data storage unit that stores write data to be written in the semiconductor memory device; and an operation speed setting unit that sets a reading speed and a writing speed to predetermined speeds under the control operation of the CPU.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

A description will now given, with reference to drawings, of an embodiment of the present invention. In the present embodiment, a DRAM (Dynamic Random Access Memory) is used as a semiconductor memory device.

Figure 1:
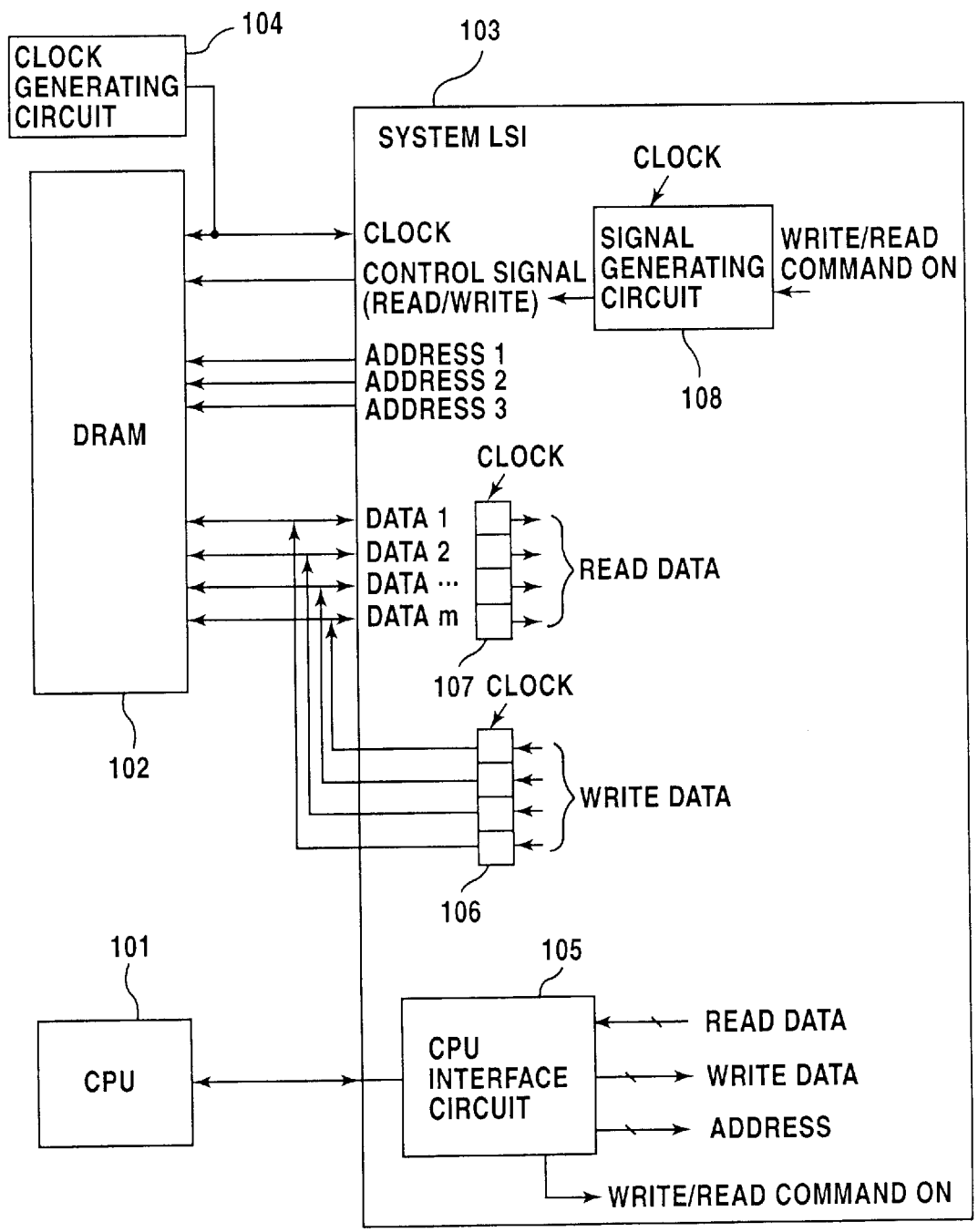
FIG. 1 is a block diagram illustrating a conventional electronic circuit system.
Figure 2:
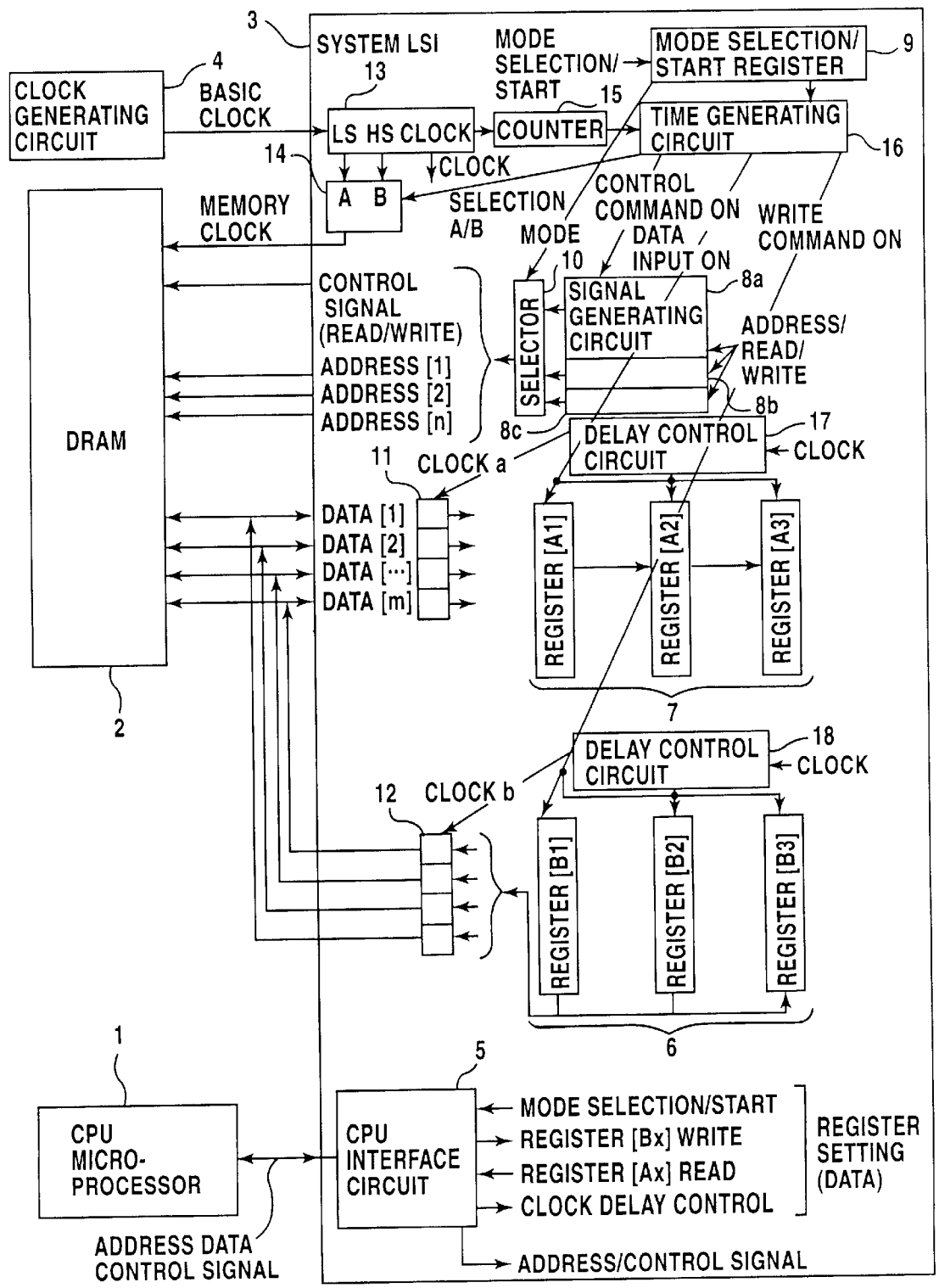
FIG. 2 is a block diagram illustrating an electronic circuit system according to an embodiment of the present invention.

An electronic circuit system according to an embodiment of the present invention is formed as shown in FIG. 2. Referring to FIG. 2, the electronic circuit system has a CPU 1, a DRAM 2, a system LSI 3 and a clock generating circuit 4. The CPU 1 controls read and write operations for data with respect to the DRAM 2. The DRAM 2 operates on the basis of a clock from the clock generating circuit 4 in the read and write operations for the data. The system LSI 3 is used as an interface circuit executing the read and write operations for the data with respect to the DRAM 2 based on the control from the CPU 1. The clock generating circuit 4 generates the clock signal used for the operation of the DRAM 2.

The system LSI 3 and the DRAM are connected by a clock signal line (a memory clock), control signal lines (a read command and a write command), address lines (address [1], address [2], . . . address [n]) and data lines (data [1], data[2], . . . data [m]). A number n of the address lines and a number m of the data lines respectively correspond to a number of bits of the capacity of the DRAM 2.

The system LSI 3 and the CPU 1 are connected by control lines (a read signal and a write signal etc.) which are required for setting operations for registers in the system LSI 3, address lines and data lines.

A clock generated by the clock generating circuit 4 is input, as a basic clock, to the system LSI 3. The clock is used as the basic clock for operations of internal circuits of the system LSI 3 as will be described later. The basic clock is divided by a frequency divider 13 so that a clock having a predetermined speed is supplied as a memory clock to the DRAM 2. That is, the DRAM 2 and the system LSI operate in synchronism with the basic clock. In recent DRAMs, as shown in FIG. 2, the control signals, such as the read command and the write command, become definite on the basis of the memory clock in order to execute the read and write operations for data at a high speed.

A detailed description will now be given of the structure and functions of the system LSI 3 included in the electronic circuit system.

The system LSI 3 has a CPU interface circuit 5, an output register group 6, an input register group 7, signal generating circuits 8a, 8b and 8c, a mode selection/start register 9, a selector 10, an input buffer 11, an output buffer 12, the frequency divider 13, a selector 14, a counter 15, a timing generating circuit 16, a delay control circuit 17 and a delay control circuit 18. The system LSI 3 functions as the interface circuit executing the read and write operations for the data with respect to the DRAM 2 based on the control from the CPU 1.

The CPU interface circuit 5 is connected to the CPU 1 by the address lines, the data lines and the control signal lines. The CPU interface circuit 5 has functions for selecting an operation mode, starting an operation (starting and stopping the operation in each mode), setting write data, setting an address, and controlling delay of the clock.

The output register group 6 is formed of three registers,: a register [B1], a register [B2] and a register [B3]. Data to be written in the DRAM 2 is successively stored in the respective registers. Although the number of registers in the output register group 6 is three in the present embodiment, the number of registers is not limited to three.

The input register group 7 is formed of serially arranged three registers: a register [A1], a register [A2] and a register [A3]. Data read out from the DRAM 2 is successively shifted in the respective registers. Although the number of registers in the input register group 7 is three in the present embodiment, the number of registers is not limited to three.

The signal generating circuits 8a, 8b and 8c include a plurality of address registers in which addresses can be set by the CPU 1. In the read and write operations with respect to the DRAM 2, an address [1], an address [2], ... and an address [n] in the address registers are output from the signal generating circuits 8a, 8b and 8c. The signal generating circuits 8a, 8b and 8c further generates read commands and write commands. Each of the signal generating circuits 8a, 8b and 8c corresponds to one of operation modes which will be described later. Although the number of signal generating circuits is three in the present embodiment, the number of signal generating circuits corresponding to the number of operation modes are needed.

The mode selection/start register 9 has a mode selection register and a start register both of which can be set by the CPU 1. For example, the following three values can be set in the mode selection register.

VALUE 1: "HIGH SPEED WRITE TESTING MODE"
VALUE 2: "HIGH SPEED READ TESTING MODE"
VALUE 3: "NORMAL USED MODE"

The following values can be set in the start register.

VALUE 0→1: "START OPERATION IN THE RESPECTIVE MODES"
VALUE 1→0: "STOP OPERATION IN THE RESPECTIVE MODES"

The system LSI 3 can execute "LOW SPEED WRITE" and "LOW SPEED READ". The system LSI 3 can further execute "HIGH SPEED WRITE" and "HIGH SPEED READ". In the "LOW SPEED WRITE" and the "LOW SPEED READ", when, after the write operation with respect to an address of the DRAM 2, the read operation with respect to the same address is executed, write data in the output register group 6 and read data in the input register group 7 are processed at accurately the same speed. In the "HIGH SPEED WRITE", the write operation is executed at a speed higher than that in the "LOW SPEED WRITE". In the "HIGH SPEED READ", the read operation is executed at a speed higher than that in the "LOW SPEED READ".

In the system LSI 3, the "NORMAL USED MODE" (VALUE 3) is usually set in the mode selection register, and the "HIGH SPEED WRITE" and the "HIGH SPEED READ" are executed. The operation in the "NORMAL USED MODE" is not limited to the above. For example, the "LOW SPEED WRITE" and the "HIGH SPEED READ", the "HIGH SPEED WRITE" and the "LOW SPEED READ", and "LOW SPEED WRITE" and the "LOW SPEED READ" may be executed.

In the "HIGH SPEED READ TESTING MODE" which differs from the "NORMAL USED MODE", after the "HIGH SPEED WRITE" is forcedly executed for know data with respect to a predetermined address of the DRAM 2, the "LOW SPEED READ" is executed with respect to the same address. The read data and the know data is then compared with each other. In the present embodiment, due to the operation in the "HIGH SPEED WRITE TESTING MODE", the operation of the "HIGH SPEED WRITE" is confirmed.

In the "HIGH SPEED READ TESTING MODE", after the "LOW SPEED WRITE" is forcedly executed for known data with respect to a predetermined address of the DRAM 2, the "HIGH SPEED READ" is executed with respect to the same address. The known data and the read data is compared with each other. In the present embodiment, due to the operation in the "HIGH SPEED READ TESTING MODE", the operation of the "HIGH SPEED READ" is confirmed.

The timing generating circuit 16 has functions for outputting, based on the contents in the mode selection/start register 9, a control command on-signal (see FIG. 2), a data input on-signal (see FIG. 2) and a write command on-signal. The control command on-signal is used to generate a timing at which the signals are output by the respective signal generating circuits. The input on-signal is used to generate a timing at which read data is input from the DRAM 2. The write command on-signal is used to generate a timing at which data is written in the DRAM 2.

The selector 10 has a function for selecting one of the signal generating circuits 8a, 8b and 8c based on the contents in the mode selection/start register 9. In the present embodiment, the signal generating circuit 8a is selected in the "HIGH SPEED WRITE TESTING MODE", the signal generating circuit 8b is selected in the "HIGH SPEED READ TESTING MODE", and the signal generating circuit 8c is selected in the "NORMAL USED MODE".

The input buffer 11 and the output buffer 2 respectively have functions for temporarily storing the read data and the write data in synchronism with clocks a and b generated by the delay control circuits 17 and 18.

The frequency dividing circuit 13 has functions for generating the memory clock for the DRAM 2 and an internal clock for the system LSI 3.

The selector 14 has a function for selecting, as the memory clock, a high speed clock or a low speed clock. In a case of the "HIGH SPEED WRITE" and the "HIGH SPEED READ", the high speed clock is selected. In a case of the "LOW SPEED WRITE" and the "LOW SPEED READ", the low speed clock is selected.

The counter 15 counts the basic clock and supplies the count value to the timing generating circuit 16.

The delay control circuit 17 is provided with a delay time control register and has a function for controlling a delay time of the clock b used to input the known data when the known data in the output register group 6 and the read data in the input register group 7 differ from each other. In the present embodiment, 0 nanosecond (ns) is set as an initial value of the delay time in the delay time control register. The delay time can be controlled by 2 nanoseconds.

The electronic circuit apparatus having the system LSI 3 formed as described above usually sets VALUE 3 in the mode selection register so as to operate in the "NORMAL USED MODE".

Thus, for example, in the write operation for data, the CPU 1 sets write data and a write address in the output register group 6 and the address register respectively via the CPU interface 5 in the system LSI 3. The write signal is then input to the signal generating circuit 8c. After this, in the system LSI 3, the write data (data [1] data [m]) is output from the output buffer 12 along with the write address (address [1]—address [n]) on the basis of the clock b. The signal generating circuit 8c activates and outputs the write command. The write data is written in the specified address of the DRAM 2 on the basis of the memory clock when the write command is activated.

On the other hand, in the read operation for data, the CPU 1 sets a read address in the address register via the CPU interface 5 and inputs the read signal to the signal generating circuit 8c. After this, in the system LSI 3, the read address is output and the signal generating circuit 8c activates and outputs the read command. Data is read out from the specified address of the DRAM 2 on the basis of the memory clock when the read command is activated. The system LSI 3 sets the read data in the input buffer 11 on the basis of clock a. In this state, the CPU 11 reads out data from the input register group 7.

As has been described above, in the "NORMA USED MODE", the electronic circuit system executes the write operation and the read operation in the same manner as in the conventional case.

Figure 3:
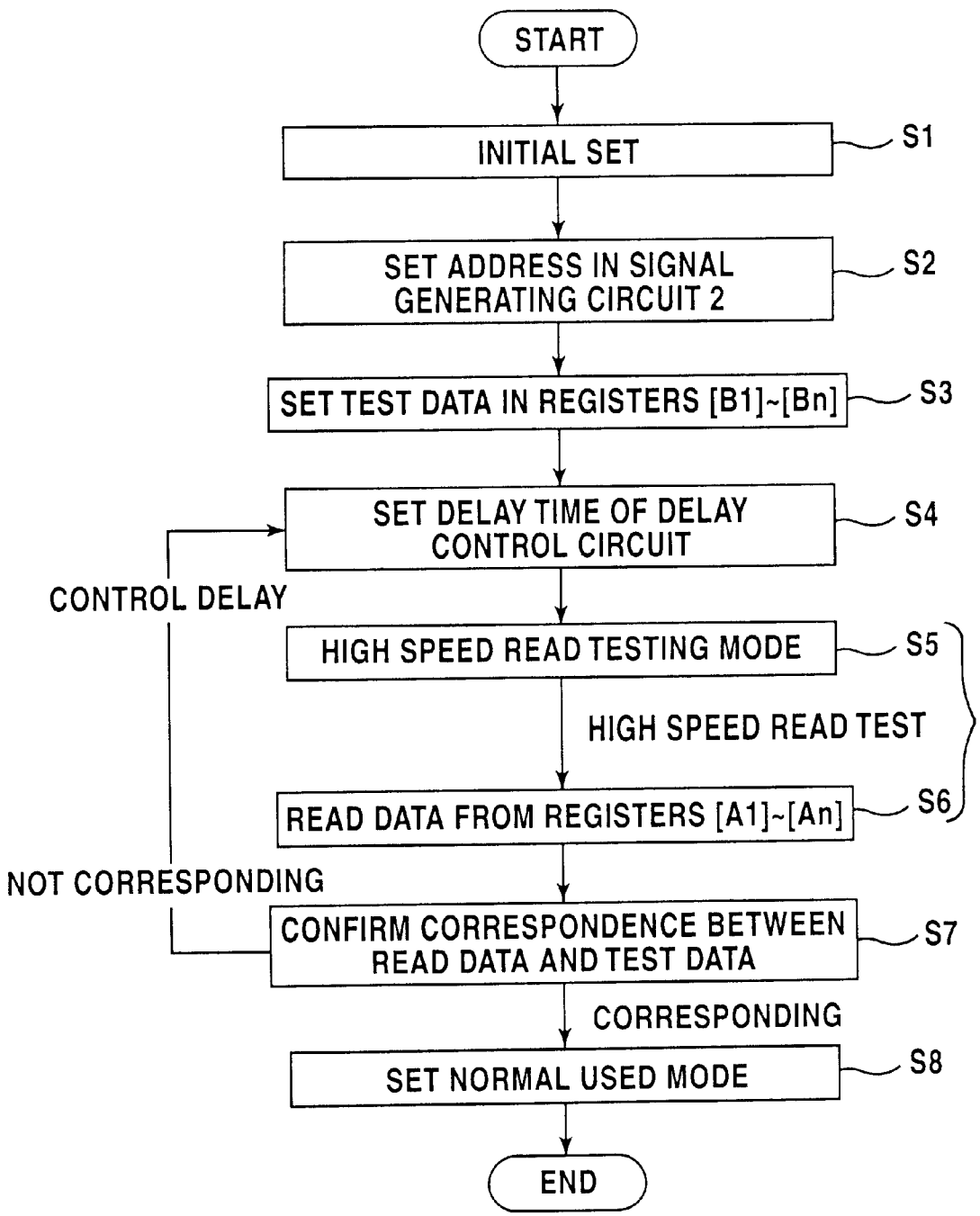
FIG. 3 is a flowchart illustrating a procedure of a control operation in a CPU.
Figure 4:
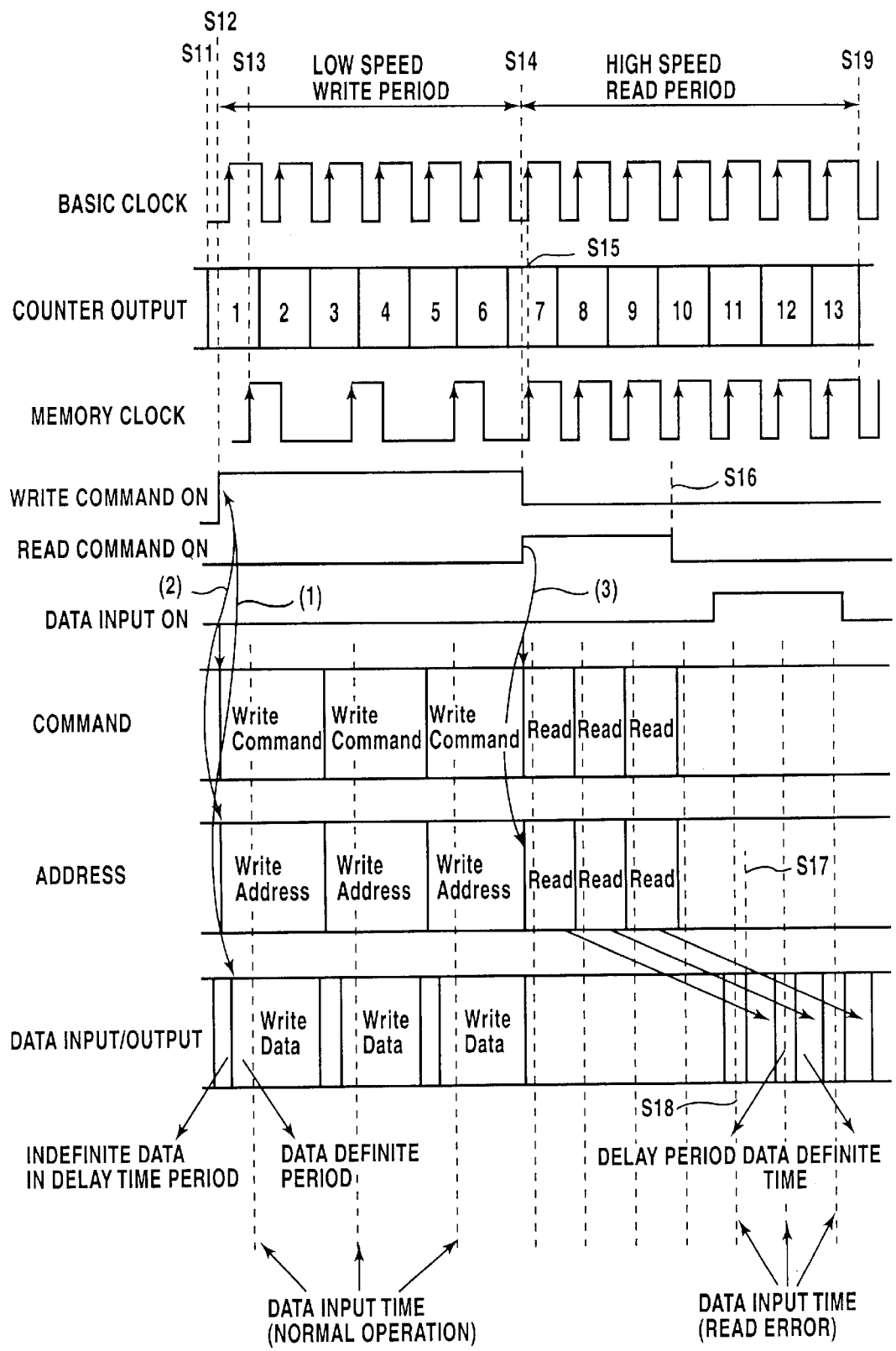
FIG. 4 is a timing chart illustrating an operation in a high speed read testing mode.

A description will now be given, with reference to FIGS. 2, 3 and 4, of the operation in the "HIGH SPEED READ TESTING MODE". The electronic circuit system executes the operation in the "HIGH SPEED READ TESTING MODES" to guarantee the "HIGH SPEED READ" operation. FIG. 3 shows a flowchart of a control procedure in the "HIGH SPEED READ TESTING MODE" in the CPU 1. FIG. 4 shows a timing chart for the "HIGH SPEED READ TESTING MODE" in the system LSI 3.

The CPU 1 changes, as the initial setting operation, the value of the start register of the system LSI 3 which is operating in the "NORML USED MODE" to the "VALUE 1→0" so that the operation in the "NORMAL USED MODE" is terminated, and sets the VALUE 2 for the "HIGH SPEED READ TESTING MODE" in the mode setting register (S1 in FIG. 3).

The CPU 1 successively sets specified addresses "X", "Y" and "Z" of the DRAM 2, with respect to which the "LOW SPEED WRITE" is being executed, to the address register in the system LSI 3 (S2). One or more addresses can be specified. In the present embodiment, three specified addresses can be set.

The CPU 1 then successively sets known data "x", "y" and "z" in the register [B1], [B2] and [B3] of the output register group 6 (S3). One or more data items can be set. In the present embodiment, three data items can be set.

The CPU 1 confirms the initial value (0 nanosecond) set in the delay time control register of the delay control circuit 17 (S4). In this state, the value of the start register is changed to the "VALUE 0→1" (S5).

When the value of the start register is changed to the "VALUE 0→1", the system LSI 3 automatically generates the control signals as shown in FIG. 4 and starts the operation in the "HIGH SPEED READ TESTING MODE". That is, as shown in FIG. 4, after the "LOW SPEED WRITE" is forcedly executed for the known data with respect to the predetermined address of the DRAM 2, the "HIGH SPEED READ" is executed with respect to the same address. In this case, the selector 14 selects, as the memory clock, "A" which is a low speed clock in the operation of the "LOW SPEED WRITE", and selects, as the memory clock, "B" which is a high speed clock in the operation of the "HIGH SPEED READ". In addition, the selector 10 selects the output of the signal generating circuit 8b.

In the system LSI 3, the counter 15 starts a count operation in synchronism with the basic clock (S11 in FIG. 4). After this, the count operation is continued until the operation in the "HIGH SPEED READ TESTING MODE" is terminated.

The timing generating circuit 16 sets the read command on-signal to a high level (S12). The signal generating circuit 8b outputs the write command and the specified address "X" to the DRAM 2 when the count value is "1" and the write command on-signal rises (② in FIG. 4). At this time, the known data "x" in the register [B1] is transmitted to the output buffer 12 when the write command on-signal rises. The output buffer 12 outputs the known data "x" to the DRAM 2 at a rising timing of the clock b (① in FIG. 4).

The known data "x" is then written in the DRAM 2 at a rising point of the memory clock (S13).

After the "LOW SPEED WRITE" is executed for the known data "x", the respective circuits of the system LSI 3 execute the "LOW SPEED WRITE" for the known data "Y" with respect to the specified address "Y" of the DRAM 2 and the "LOW SPEED WRITE" for the known data "z" with respect to the specified address "z" of the DRAM 2. When the count value reaches "6", all operations of "LOW SPEED WRITE" are terminated. At this time, the timing generating circuit 16 returns the write command on-signal to a low level (S14).

The timing generating circuit 16 sets the read command on-signal to the high level and outputs it (S14). The signal generating circuit 8b outputs the read command and the specified address "X" to the DRAM 2 when the count value reaches "7" and the read command on-signal rises (③ in FIG. 4). The timing generating circuit 16 returns the read command on-signal to the low level after outputting all the addresses "Y" and "Z" and the read command to the DRAM 2 (S16).

After the read command and the specified address "X" are output to the DRAM 2 (③ in FIG. 4), the DRAM 2 inputs the read command at a rising point of the memory clock (S15). After a predetermined delay time has elapsed, the DRAM 2 outputs the read data (S17). The system LSI 3 inputs the read data to the register [A1] when the count value reaches "11" and the clock a rises (S18). The memory clock and the clock a are in the common-mode.

After the "HIGH SPEED READ" with respect to the specified address "X" is executed, the respective circuits of the system LSI 3 execute, in the same manner as in the above case, the "HIGH SPEED READ" with respect to the specified address "Y" of the DRAM 2 and the "HIGH SPEED READ" with respect to the specified address "Z" of the DRAM 2. When the count value reaches "13", the operation of the "HIGH SPEED READ" is terminated (S19). Every time data is read out from the DRAM 2, the previous data is shifted to registers [A2] and [A3]. Thus, at the present time, the first read data is in the register [A3].

In addition, simultaneously with the step S19, the system LSI 3 automatically returns the value of the start register to the "VALUE 1→0" and the operation in the "HIGH SPEED READ TESTING MODE" is terminated as shown in FIG. 4 (S5 in FIG. 3).

The CPU 1 then reads out the read data from the input register group 7 via the CPU interface circuit 5 (S6). The known data items "x", "y" and "z" and the read data are compared with each other and it is determined whether the known data and the read data correspond with each other (S7). In addition, the CPU 1 reads out the know data items "x", "y" and "z", from the output register group 6 and the read data from the input register group 7 via the CPU interface circuit 5 (S6). It is then determined whether the read data and each of the known data items correspond with each other (S7). The system LSI 3 may also executes, based on an instruction from the CPU 1, the data comparing operation.

In the present embodiment, the read data is input to the input buffer 11 before the clock a rises in step S17, that is, before step S17 in which the read data becomes definite, the input buffer 11 receives the read data. Since error data items are thus set in the respective registers [A1], [A2] and [A3], in the present embodiment, the known data and the read data do not correspond with each other (not corresponding in S7).

Thus, the CPU 1 changes the delay time set in the delay time control register in the delay control circuit 17 by 2 nanoseconds (ns)(S4). In this state, the value of the start register is changed to the "VALUE 0→1" (S5), the operation restarts in the "HIGH SPEED READ TESTING MODE".

The CPU 1 and the system LSI 3 repeatedly change the delay time set in the delay time control register in the delay control circuit 17 by 2 nanoseconds until the known data and the read data correspond with each other. As a result, the operation in steps S4 to S7 shown in FIG. 3 and steps S11 to S19 shown in FIG. 4 is repeatedly executed.

If the known data and the read data correspond with each other, the CPU 1 sets the value of the mode setting register to the "VALUE 3" for the "NORMAL USED MODE" (S8). The electronic circuit system terminates the operation in the "HIGH SPEED READ TESTING MODE" as shown in FIG. 3.

Figure 5:
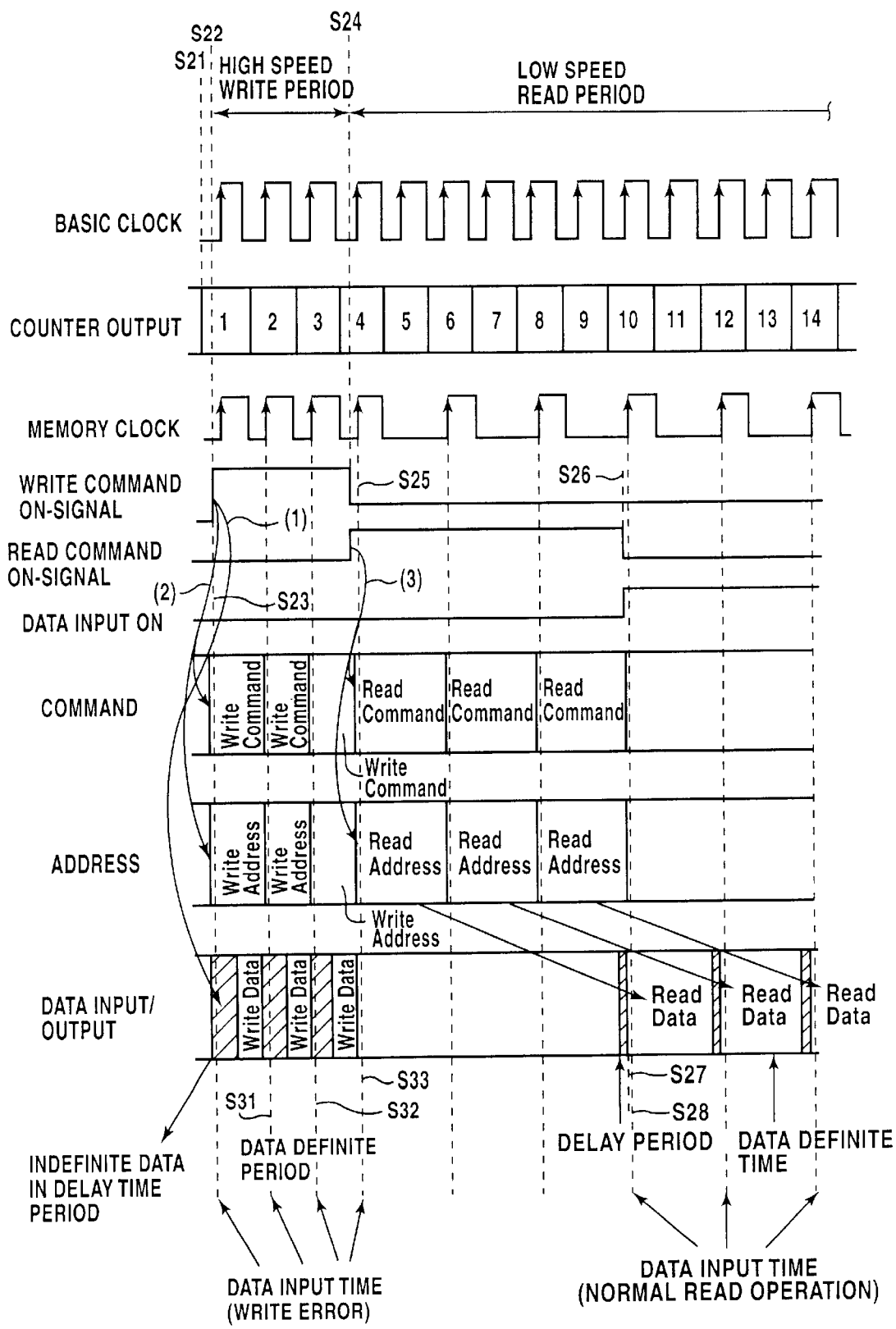
FIG. 5 is a timing chart illustrating an operation in a high speed write testing mode.

A description will now be give, with reference to FIGS. 2, 3 and 5, of the operation in the "HIGH SPEED WRITE TESTING MODE" in the electronic circuit system according to the present embodiment of the present invention. The electronic circuit system executes the operation in the "HIGH SPEED WRITE TESTING MODE" to guarantee the operation of the "HIGH SPEED WRITE". FIG. 5 shows a timing chart for the operation in the "HIGH SPEED WRITE TESTING MODE" in the system LSI 3.

The CPU 1 changes, as the initial setting operation, the value of the start register of the system LSI 3 which is operating in the "NORML USED MODE" to the "VALUE 1→0" so that the operation in the "NORMAL USED MODE" is terminated, and sets the VALUE 1 for the "HIGH SPEED WRITE TESTING MODE" in the mode setting register (S1 in FIG. 3).

The CPU 1 successively sets specified addresses "X", "Y" and "Z" of the DRAM 2, with respect to which the "HIGH SPEED WRITE" is being executed, to the address register in the system LSI 3 (S2). One or more addresses can be specified. In the present embodiment, three specified addresses can be set.

The CPU 1 then successively sets known data "x", "y" and "z" in the register [B1], [B2] and [B3] of the output register group 6 (S3). One or more data items can be set. In the present embodiment, three data items can be set.

The CPU 1 confirms the initial value (0 nanosecond) set in the delay time control register of the delay control circuit 17 (S4). In this state, the value of the start register is changed to the "VALUE 0→1" (S5).

When the value of the start register is changed to the "VALUE 0→1", the system LSI 3 automatically generates the control signals as shown in FIG. 5 and starts the operation in the "HIGH SPEED WRITE TESTING MODE". That is, as shown in FIG. 5, after the "HIGH SPEED WRITE" is forcedly executed for the known data with respect to the predetermined address of the DRAM 2, the "LOW SPEED READ" is executed with respect to the same address. In this case, the selector 14 selects, as the memory clock, "B" which is the high speed clock in the operation of the "HIGH SPEED WRITE", and selects, as the memory clock, "A" which is the low speed clock in the operation of the "LOW SPEED READ". In addition, the selector 10 selects the output of the signal generating circuit 8a.

In the system LSI 3, the counter 15 starts a count operation in synchronism with the basic clock (S21 in FIG. 5). After this, the count operation is continued until the operation in the "HIGH SPEED WRITE TESTING MODE" is terminated.

The timing generating circuit 16 sets the read write command on-signal to the high level (S22). The signal generating circuit 8a outputs the write command and the specified address "x" to the DRAM 2 when the write command on-signal rises (② in FIG. 5). At this time, the known data "x" in the register [B1] is transmitted to the output buffer 12 when the write command on-signal rises. The output buffer 12 outputs the known data "x" to the DRAM 2 at a rising timing of the clock b (① in FIG. 5).

The known data "x" is then written in the DRAM 2 at a rising point of the memory clock (S23).

After the "HIGH SPEED WRITE" is executed for the known data "x", the respective circuits of the system LSI 3 execute the "HIGH SPEED WRITE" for the known data "y" with respect to the specified address "Y" of the DRAM 2 and the "HIGH SPEED WRITE" for the known data "z" with respect to the specified address "Z" of the DRAM 2. When the count value reaches "4", all operations of "HIGH SPEED WRITE" are terminated. At this time, the timing generating circuit 16 returns the write command on-signal to the low level (S24).

The timing generating circuit 16 sets the read command on-signal to the high level and outputs it (S24). The signal generating circuit 8a outputs the read command and the specified address "X" to the DRAM 2 when the count value reaches "4" and the read command on-signal rises (③ in FIG. 5). The timing generating circuit 16 returns the read command on-signal to the low level after outputting all the addresses "Y" and "Z" and the read command to the DRAM 2 (S26).

After the read command and the specified address "X" are output to the DRAM 2 (③ in FIG. 5), the DRAM 2 inputs the read command at a rising point of the memory clock (S25). After a predetermined delay time has elapsed, the DRAM 2 outputs the read data (S27). The system LSI 3 inputs the read data to the register [A1] when the count value reaches "10" and the clock a rises (S18). The memory clock and the clock a are in the common-mode.

After the "LOW SPEED READ" with respect to the specified address "X" is executed, the respective circuits of the system LSI 3 execute, in the same manner as in the above case, the "LOW SPEED READ" with respect to the specified address "Y" of the DRAM 2 and the "LOW SPEED READ" with respect to the specified address "Z" of the DRAM 2. All the operations of the "LOW SPEED READ" is then terminated. Every time data is read out from the DRAM 2, the previous data is shifted to registers [A2] and [A3]. Thus, at the present time, the first read data is in the register [A3].

In addition, after receiving read data from all the specified address "X", "Y" and "Z", the system LSI 3 automatically returns the value of the start register to the "VALUE 1→0" and the operation in the "HIGH SPEED WRITE TESTING MODE" is terminated (S5 in FIG. 3).

The CPU 1 then reads out the read data from the input register group 7 via the CPU interface circuit 5 (S6). The known data items "x", "y" and "z" and the read data are compared with each other and it is determined whether the known data and the read data correspond with each other (S7). In addition, the CPU 1 reads out the know data items "x", "y" and "z" from the output register group 6 and the read data from the input register group 7 via the CPU interface circuit 5 (S6). It is then determined whether the read data and each of the known data items correspond with each other (S7). The system LSI 3 may also executes, based on an instruction from the CPU 1, the data comparing operation.

In the present embodiment, the known data is output from the output buffer 12 at a rising point of the clock b (① in FIG. 5). Since data is input to the DRAM 2 before the data becomes definite on the data lines, the know data is not written in the DRAM 2. Error data items are set in the respective registers [A1], [A2] and [A3]. Thus, in the present embodiment, the known data and the read data do not correspond with each other (not corresponding in S7).

Thus, the CPU 1 changes the delay time set in the delay time control register in the delay control circuit 18 by 2 nanoseconds (ns)(S4). In this state, the value of the start register is changed to the "VALUE 0→1" (S5), the operation restarts in the "HIGH SPEED WRITE TESTING MODE".

The CPU 1 and the system LSI 3 repeatedly change the delay time set in the delay time control register in the delay control circuit 18 by 2 nanoseconds until the known data and the read data correspond with each other. As a result, the operation in steps S4 to S7 shown in FIG. 3 and steps S21 to S289 shown in FIG. 5 is repeatedly executed. In this case, since a time at which the know data (the write data shown in FIG. 5) becomes definite is delayed by 2 nanoseconds, the memory clock used to input data rises in steps 31, 32 and 33 shown in FIG. 5.

If it is determined, in step S7, that the known data and the read data correspond with each other, the CPU 1 sets the value of the mode setting register to the "VALUE 3" for the "NORMAL USED MODE" (S8). The electronic circuit system terminates the operation in the "HIGH SPEED WRITE TESTING MODE" as shown in FIG. 3.

As has been described above, in the electronic circuit system, shown in FIG. 2, according to the embodiment of the present invention, the operations in the "HIGH SPEED READ TESTING MODE" and the "HIGH SPEED WRITE TESTING MODE" are executed so that the read data and the write data correspond with each other. Thus, even if the read data in the input register group 7 and the write data in the output register group 8 differ from each other, it can be determined whether the operations of the "HIGH SPEED WRITE" and "HIGH SPEED READ" in the "NORMAL USED MODE" are error-free. That is, the electronic circuit system according to the embodiment of the present invention can determines whether errors have occurred in the operation of the "HIGH SPEED READ", the operation of the "HIGH SPEED WRITE" or the operations of both the "HIGH SPEED READ" and "HIGH SPEED WRITE".

In addition, the electronic circuit system according to the embodiment of the present invention executes the operations in the "HIGH SPEED READ TESTING MODE" and the "HIGH SPEED WRITE TESTING MODE" and can control the delay control circuit 17 and the delay control circuit 18. That is, when errors have occurred in the operation of the "HIGH SPEED WRITE", the delay time of the clock b is controlled. When errors have occurred in the operation of the "HIGH SPEED READ", the delay time of the clock a is controlled. Thus, in the electronic circuit system according to the embodiment of the present invention, even if there is the wiring delay in the data lines, data can be written in the DRAM 2 with certainty and the system LSI 3 can read the data with certainty.

As has been described above, according to the embodiment of the present invention, the electronic circuit system having the system LSI 3 with which the CPU 1 can execute the read and write operations for data with respect to the DRAM 2 with certainty even if there is the wiring delay in the data lines can be provided.

In addition, in the electronic circuit system according to the embodiment of the present invention, the delay time of each of the clock a and clock b can be controlled for each of a plurality of data lines connecting the DRAM 2 and the system LSI 3.

In this case, the CPU 1 can globally control the delay time of each of the clock a and clock b by controlling the delay control circuits 17 and 18 as described above and control the delay time of each of the clock a and clock b for each of the plurality of data lines separately. Thus, even if there is variation of wiring delay among the data lines connecting the DRAM 2 and the system LSI 3 and data in a part of the data line is not read and written, the delay time of each of the clock a and clock b for the part of the data lines can be controlled. Thus, data can be efficiently read an written with certainty.

Thus, according to the present invention, the electronic circuit system having the system LSI 3 with which the CPU 1 can accurately execute the read and write operations for data with respect to the DRAM 2 even if there is the variation of the wiring delay in the data lines can be provided.

Figure 6:
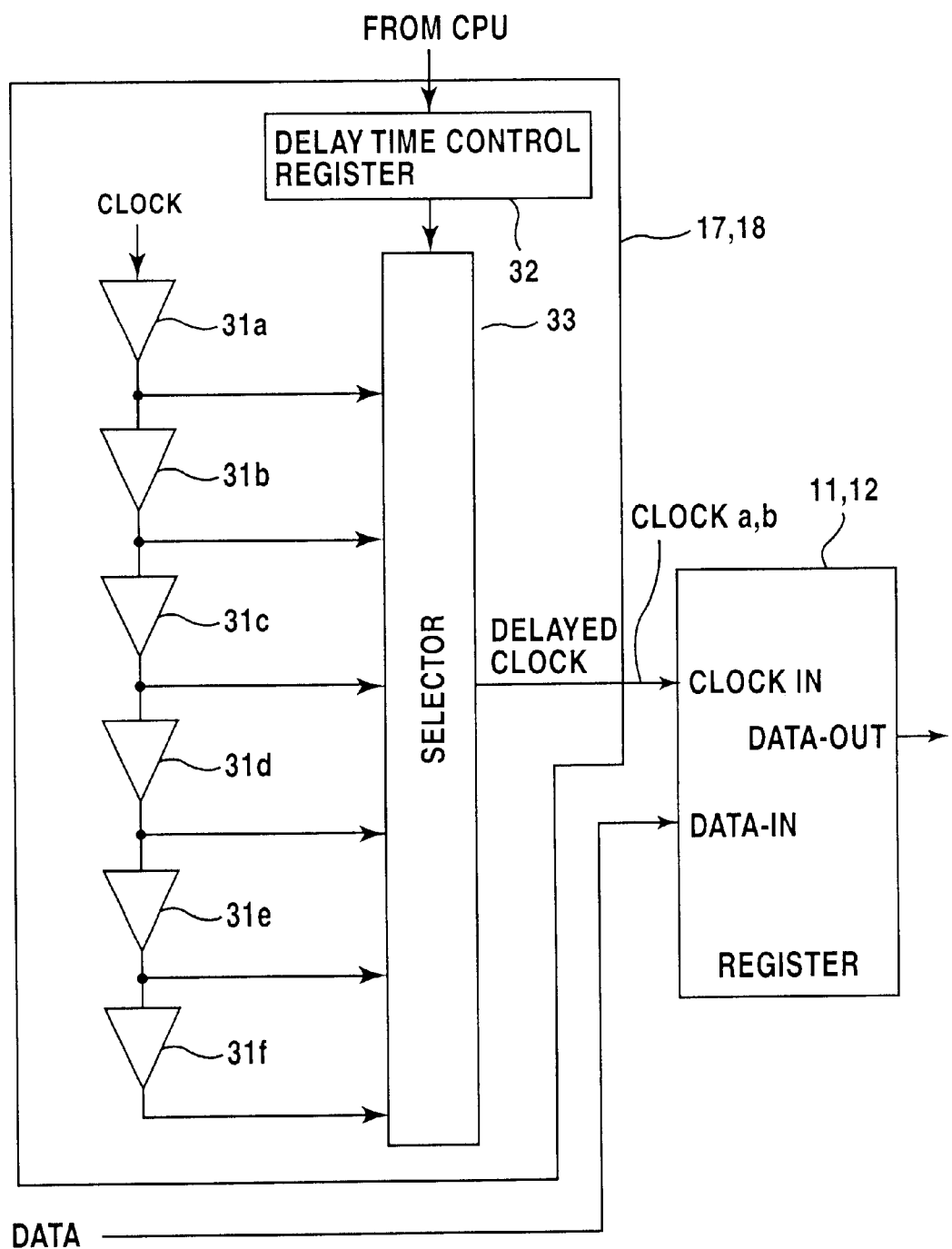
FIG. 6 is a circuit diagram illustrating a detailed structure of a delay control circuit.

FIG. 6 shows a detailed structure of each of the delay control circuits 17 and 18 in the system LSI 3 in the electronic circuit system shown in FIG. 2.

Referring to FIG. 6, each of the delay control circuits 17 and 18 has delay elements 31a, 31b, 31c, 31d, 31e and 31f which are serially connected, a delay time control register 32 and a selector 33. Each of the delay elements has, for example, a delay time of 2 nanoseconds. The number of delay elements is not limited to six as shown in FIG. 6.

In each of the delay control circuits 17 and 18, due to the control operation of the CPU 1, the delay time is set in the delay time control register 32. The selector 33 selects the output from one of the delay elements 31a–31f, located at a position corresponding to the delay time set in the delay time control register 32. As a result, the clock a or b passes through delay elements: from the first delay element 31a to the selected delay element so as to be delayed, and is supplied to the input buffer 11 or the output buffer 12.

The present invention is not limited to the aforementioned embodiments, and other variations and modifications may be made without departing from the scope of the claimed invention.

The present application is based on Japanese priority application No.10-139800 filed on May 21, 1998, the entire contents of which are hereby incorporated by reference.

What is claimed is:

1. An electronic circuit system comprising:
   a semiconductor memory device that operates on the basis of a clock; and
   an interface circuit that permits read and write operations for data with respect to said: memory device under a control operation of said CPU, wherein said interface circuit comprises:
   a read data storage unit that stores read data from said semiconductor memory device;
   a write data storage unit that stores write data to be written in said semiconductor memo device; and
   an operation speed setting unit that sets a reading speed and a writing speed to predetermined speeds under the control operation of said CPU, wherein said CPU compares the read data in said read data storage unit and the write data in said write data storage unit and controls delay timing based on this comparison, wherein said CPU executes a first operation and a second operation, the first operation is to execute the read operation for a first address of said: memory device in a high reading speed set by said operation speed setting unit after executing the write operation for said first address in a low writing speed set by said operation speed setting unit, and the second operation is to execute the read operation or a second address of said: memory device in a low reading speed set by said operation speed setting unit after executing the write operation for said second address in a high writing speed set by said operation speed setting unit, said high reading speed being higher than said low speed, said high writing speed being higher than said low writing speed.

2. The electronic circuit system as claimed in claim 1, wherein the read data in said read data storage unit and the write data in said write data storage unit correspond with each other when, after a write operation for an address of said memory device in the low writing speed is executed, a read operation for the address of said: memory device in the low reading speed is executed.

3. The electronic circuit system as claimed in claim 1, wherein said CPU detects whether the read data and the write data correspond with each other after one of the first operation and the second operation is executed.

4. The electronic circuit system as claimed in claim 1, wherein said interface circuit has a timing control unit that controls the delay timing of the clock when the read data in said read data storage unit and the write data in said write data storage unit do not correspond with each other.

5. The electronic circuit system as claimed in claim 4, wherein said timing control unit controls the delay timing of the clock for each of data lines, connecting said semiconductor memory device and said interface circuit, separately.

6. The electronic circuit system as claimed in claim 1, wherein said read data storage unit has a plurality of registers in which the read data from said semiconductor memory device is successively shifted.

7. The electronic circuit system as claimed in claim 1, wherein said write data storage unit has a plurality of registers in which the write data to be written in said semiconductor memory device is successfully shifted.

8. The electronic circuit system as claimed in claim 1, wherein a usual read operation is executed in said high reading speed, and a usual write operation is executed in said high writing speed.

9. The electronic circuit system as claimed in claim 1, wherein one data bus and one clock are provided between said: memory device and said interface circuit.

10. An interface circuit that permits read and write operations for data with respect to a semiconductor memory device under a control operation of a CPU, said interface circuit comprising:
   a read data storage unit that stores read data from said semiconductor memory device;
   a write data storage unit that stores write data to be written in said semiconductor memory device; and
   an operation speed setting unit that sets a reading speed and a writing speed to predetermined speeds under the control operation of said CPU, wherein said CPU compares the read date in said read storage unit and the write data in said write data storage unit and controls delay timing based on this comparison, wherein said CPU executes a first operation said and a second operation, the first operation is to execute the read operation for a first address of said: memory device in a high reading speed set by said operation speed setting unit after executing the write operation for said first address in a low writing speed set by said operation speed setting unit, and the second operation is to execute the read operation for a second address of said: memory device in a low reading speed set by said operation speed setting unit after executing the write operation for said second address in a high writing speed set by said operation speed setting unit, said high reading speed being higher than said low reading speed, said high writing speed being higher than said low writing speed.

11. The interface circuit as claimed in claim 10, wherein the read data in said read data storage unit and the write data in said write data storage unit correspond with each other when, after a write operation for an address of said semiconductor memory device in the low writing speed is executed, a read operation for the address of said: memory device in the low reading speed is executed.

12. The interface circuit as claimed in claim 10 further comprising:
   a timing control unit that controls the delay timing of the clock when the read data in said read data storage unit and the write data in said write data storage unit do not correspond with each other.

13. The interface circuit as claimed in claim 12, wherein said timing control unit controls the delay timing of the clock for each of data lines, connecting said semiconductor memory device and said interface circuit, separately.

14. The interface circuit as claimed in claim 10, wherein said read data storage unit has a plurality of registers in which the read data from said semiconductor memory device is successively shifted.

15. The interface circuit as claimed in claim 10, wherein said write data storage unit has a plurality of registers in which the write data to be written in said semiconductor memory device is successively shifted.

16. The interface circuit as claimed in claim 12, wherein a usual read operation is executed in said high reading speed, and a usual write operation is executed in said high writing speed.

17. The interface circuit as claimed in claim 10, wherein one data bus and one clock are provided between said: memory device and said interface circuit.

* * * * *